United States Patent
Leng et al.

(10) Patent No.: US 11,429,070 B2
(45) Date of Patent: Aug. 30, 2022

(54) INHOMOGENEOUS SAMPLE EQUALIZATION METHOD AND SYSTEM FOR PRODUCT ASSEMBLY PROCESS

(71) Applicant: GUANGDONG UNIVERSITY OF TECHNOLOGY, Guangzhou (CN)

(72) Inventors: Jiewu Leng, Guangzhou (CN); Man Zhou, Guangzhou (CN); Guolei Ruan, Guangzhou (CN); Qiang Liu, Guangzhou (CN); Ding Zhang, Guangzhou (CN); Duxi Yan, Guangzhou (CN)

( * ) Notice: Subject to any disclaimer, the term of this patent is extended or adjusted under 35 U.S.C. 154(b) by 129 days.

(21) Appl. No.: 17/134,369

(22) Filed: Dec. 26, 2020

(65) Prior Publication Data
US 2021/0286326 A1    Sep. 16, 2021

(30) Foreign Application Priority Data

Mar. 13, 2020    (CN) .......................... 202010175032.0

(51) Int. Cl.
*G06K 9/00*    (2022.01)
*G05B 13/02*    (2006.01)
(Continued)

(52) U.S. Cl.
CPC ......... *G05B 13/0275* (2013.01); *G06F 17/16* (2013.01); *G06K 9/6215* (2013.01); *G06K 9/6221* (2013.01)

(58) Field of Classification Search
CPC .......... G06N 20/00; G06N 7/005; G06N 3/08; G06N 3/0454; G06N 3/0445; G06N 20/20; G06N 3/088; G06N 5/003; G06N 5/04; G06N 3/006; G06N 3/0427; G06N 3/0472; G06N 3/02; G06N 3/049; G06N 3/0635;
(Continued)

(56) References Cited

U.S. PATENT DOCUMENTS

2006/0285755 A1    12/2006 Hager et al.
2018/0012355 A1*   1/2018 Sarkar ................... G06T 7/0012

FOREIGN PATENT DOCUMENTS

CN    104657418 A    5/2015
CN    105868791 A    8/2016
(Continued)

OTHER PUBLICATIONS

Iam-On, Comparative study of matrix refinement approaches for ensemble clustering, 2012, Springer (Year: 2012).*
(Continued)

*Primary Examiner* — Alex Kok S Liew

(57) ABSTRACT

The disclosure discloses an inhomogeneous sample equalization method and system for a product assembly process. The method includes the following steps of: A: calculating a similarity among different samples; B: constructing a fuzzy compatibility matrix S for representing the similarity among all the samples, and constructing a fuzzy compatibility space X with different granule layers through the fuzzy compatibility matrix S; C: based on a granular calculating mode, screening out a granule layer with a maximum comprehensive value of an information increment and the similarity among the samples from the fuzzy compatible space X to serve as an optimal granule layer; and D: carrying out equalization processing on the sample of the optimal granule layer.

8 Claims, 1 Drawing Sheet

(51) Int. Cl.
*G06F 17/16* (2006.01)
*G06K 9/62* (2022.01)

(58) Field of Classification Search
CPC ........ G06N 3/123; G06N 10/00; G06N 10/40; G06N 3/04; G06N 3/126; G06N 10/20; G06N 10/60; G06N 20/10; G06N 3/084; G06N 5/046; G06K 9/6218; G06K 9/6215; G06K 9/6268; G06K 9/6273
See application file for complete search history.

(56) References Cited

FOREIGN PATENT DOCUMENTS

| | | |
|---|---|---|
| CN | 110766055 A | 2/2020 |
| CN | 111291818 A | 6/2020 |
| CN | 111832664 A | 10/2020 |

OTHER PUBLICATIONS

Hu, Incremental fuzzy cluster ensemble learning based on rough set theory, Jun. 2017, Elsevier (Year: 2017).*

* cited by examiner

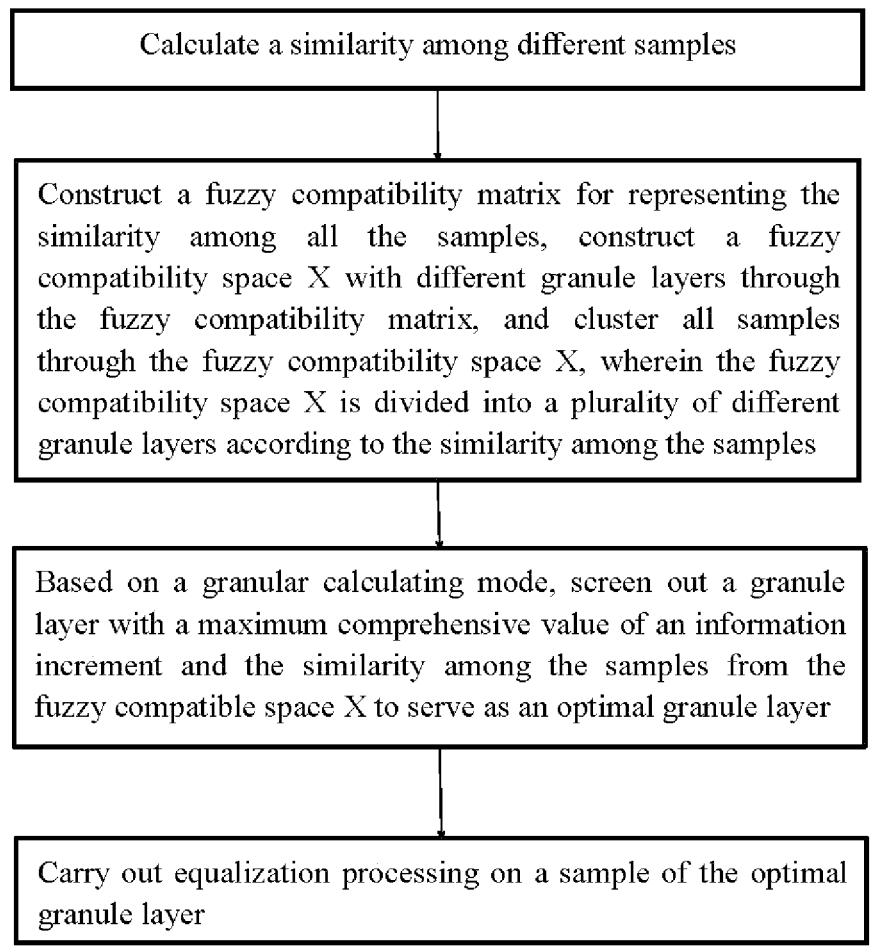

INHOMOGENEOUS SAMPLE EQUALIZATION METHOD AND SYSTEM FOR PRODUCT ASSEMBLY PROCESS

CROSS REFERENCES TO RELATED APPLICATIONS

The present application claims foreign priority of Chinese Patent Application No. 202010175032.0, filed on Mar. 13, 2020 in the State Intellectual Property Office of China, the disclosures of all of which are hereby incorporated by reference.

TECHNICAL FIELD

The disclosure relates to the field of smart manufacturing, and more particularly, to an inhomogeneous sample equalization method and system for a product assembly process.

BACKGROUND

With the rise of smart manufacturing, more and more manufacturing companies apply a machine learning algorithm to actual production to improve production efficiency and reduce labor cost consumption, such as establishing a model through machine learning in a product assembly process to predict production costs of products, required time, and the like. Initial sample data is an important part of the machine learning. Accuracy and homogeneity of the initial data may affect accuracy of a final result and generalization ability of the machine learning algorithm.

However, samples are inhomogeneous in an assembly process of same products with different styles. Since the same products with different styles may have subtle differences in function, these subtle differences may lead to different product assembly processes. One product has a main function and multiple additional functions, and the additional functions have different improvement effects on a sales volume of the product. For the additional functions capable of improving the sales volume of the product, manufacturers may design more styles for the additional functions with great improvement effects on the sales volume, so that products with more styles have the additional functions. For the additional functions with insignificant improvement effects on the sales volume, products with the additional functions have fewer styles, so that a model tends to be more in line with a characteristic of an assembly process of a product with large output, and a generalization ability of the model is insufficient. Moreover, for the assembly process of the same products with different styles, a strong relevance of internal data of the samples causes difficult homogenization of the samples.

SUMMARY

The disclosure aims to provide an inhomogeneous sample equalization method and system for a product assembly process to solve the above problems.

In order to achieve the objectives, the disclosure employs the following technical solutions.

An inhomogeneous sample equalization method for a product assembly process takes an assembly process topological structure of a product as a sample, and takes assembly process topological structures of same products with different styles as different samples, wherein the method comprises the following steps of:

step A: calculating a similarity among different samples;

step B: constructing a fuzzy compatibility matrix S for representing the similarity among all the samples, constructing a fuzzy compatibility space X with different granule layers through the fuzzy compatibility matrix S, and clustering all samples through the fuzzy compatibility space X, wherein the fuzzy compatibility space X is divided into a plurality of different granule layers according to the similarity among the samples;

step C: based on a granular calculating mode, screening out a granule layer with a maximum comprehensive value of an information increment and the similarity among the samples from the fuzzy compatible space X to serve as an optimal granule layer; and step D: carrying out equalization processing on a sample of the optimal granule layer.

An inhomogeneous sample equalization system for a product assembly process takes an assembly process topological structure of a product as a sample, and takes assembly process topological structures of same products with different styles as different samples, wherein the system includes:

a similarity generation module configured to calculate a similarity among different samples;

a fuzzy compatibility space construction module configured to construct a fuzzy compatibility matrix S for representing the similarity among all the samples, construct a fuzzy compatibility space X with different granule layers through the fuzzy compatibility matrix S, and cluster all samples through the fuzzy compatibility space X, wherein the fuzzy compatibility space X is divided into a plurality of different granule layers according to the similarity among the samples;

an optimal granule layer generation module configured to, based on a granular calculating mode, screen out a granule layer with a maximum comprehensive value of an information increment and the similarity among the samples from the fuzzy compatible space X to serve as an optimal granule layer; and an equalization module configured to carry out equalization processing on a sample of the optimal granule layer.

According to the inhomogeneous sample equalization method for the product assembly process, equalization of inhomogeneous samples of the product assembly process is solved, and an accuracy of a final prediction result and a generalization ability of a model are improved; the similarity of the assembly process topological structures of the same products with different styles is also considered, and the samples are clustered from this point of view, so that a problem that the samples are not easy to be homogenized due to a strong relevance of internal data of the samples is solved, thus being more in line with a characteristic of such sample of the product assembly process, and making a final equalized result more scientific. By constructing the fuzzy compatibility space X, the samples may be clustered into different granule layers, and the samples may be observed and analyzed from multiple granule layers, so as to obtain the optimal granule layer $C(\lambda_o)$, so that more representative and accurate sample granule may be obtained, and the number of the samples in each sample granule is homogenized from the optimal granule layer $C(\lambda_o)$, so that an equalized effect is more representative.

BRIEF DESCRIPTION OF THE DRAWINGS

The drawings further illustrate the disclosure, but the contents in the drawings do not constitute any limitation on the disclosure.

FIG. 1 is a flow chart of an inhomogeneous sample equalization method for a product assembly process according to one of embodiments of the disclosure.

DETAILED DESCRIPTION

The technical solutions of the disclosure will be further described hereinafter with reference to the accompanying drawings and the specific implementations.

Embodiment 1

An inhomogeneous sample equalization method for a product assembly process according to the embodiment takes an assembly process topological structure of a product as a sample, and takes assembly process topological structures of same products with different styles as different samples. As shown in FIG. 1, the method includes the following steps of:

step A: calculating a similarity among different samples;

step B: constructing a fuzzy compatibility matrix S for representing the similarity among all the samples, constructing a fuzzy compatibility space X with different granule layers through the fuzzy compatibility matrix S, and clustering all samples through the fuzzy compatibility space X, wherein the fuzzy compatibility space X is divided into a plurality of different granule layers according to the similarity among the samples;

step C: based on a granular calculating mode, screening out a granule layer with a maximum comprehensive value of an information increment and the similarity among the samples from the fuzzy compatible space X to serve as an optimal granule layer; and step D: carrying out equalization processing on a sample of the optimal granule layer.

According to the inhomogeneous sample equalization method for the product assembly process, equalization of inhomogeneous samples of the product assembly process is solved, and an accuracy of a final prediction result and a generalization ability of a model are improved; the similarity of the assembly process topological structures of the same products with different styles is also considered, and the samples are clustered from this point of view, so that a problem that the samples are not easy to be homogenized due to a strong relevance of internal data of the samples is solved, thus being more in line with a characteristic of such sample of the product assembly process, and making a final equalized result more scientific. The same products with different styles may be mobile phones with different styles, such as a senior citizen mobile phone, a bezel-less display mobile phone, a curved display mobile phone, a three-camera mobile phone, a single-camera mobile phone, and the like.

According to the inhomogeneous sample equalization method for the product assembly process, by constructing the fuzzy compatibility space X, the samples may be clustered into different granule layers, and the samples may be observed and analyzed from multiple granule layers, so as to obtain the optimal granule layer $C(\lambda_o)$, so that more representative and accurate sample granule may be obtained, and the number of the samples in each sample granule is homogenized from the optimal granule layer $C(\lambda_o)$, so that an equalized effect is more representative.

Preferably, the step A specifically includes:

step A1: calculating a node similarity among different samples:

$$S_{node}(v_i, v_j) = \frac{2 \times m_{i,j}}{e_i + e_j}$$

wherein i represents a same product of an $i^{th}$ type, j represents a same product of a $j^{th}$ type, and $S_{node}(v_i, v_j)$ represents a node similarity between an assembly process topological structure $v_i$ the same product of the $i^{th}$ type and an assembly process topological structure $v_j$ of the same product of the $j^{th}$ type; $m_{i,j}$ represents a number of nodes matched in the assembly process topological structure $v_i$ and the assembly process topological structure $v_j$; $e_i$ represents a sum of a number of all nodes in the assembly process topological structure $v_i$; and $e_j$ represents a sum of a number of all nodes in the assembly process topological structure $v_j$;

step A2: calculating a topological relation similarity among different samples:

$$S_{rel}(v_i, v_j) = \frac{2 \times M_{i,j}}{E_i + E_j}$$

wherein $S_{rel}(v_i, v_j)$ represents a topological relation similarity between the assembly process topological structure $v_i$ the same product of the $i^{th}$ type and the assembly process topological structure $v_j$ of the same product of the $j^{th}$ type; $M_{i,j}$ represents a number of relation edges matched in the assembly process topological structure $v_i$ and the assembly process topological structure $v_j$; $E_i$ represents a sum of a number of all relation edges in the assembly process topological structure $v_i$; and $E_j$ represents a sum of a number of all relation edges in the assembly process topological structure $v_j$; and step A3: calculating a topological structure similarity among different samples:

$$S(i,j) = S_{node}(v_i,v_j) \times W_{node} + S_{rel}(v_i,v_j) \times W_{rel},$$

wherein S(i, j) represents the topological structure similarity between the assembly process topological structure $v_i$ of the same product of the $i^{th}$ type and the assembly process topological structure $v_j$ of the same product of the $j^{th}$ type, $W_{node}$ is a preset node weight parameter, and $W_{rel}$ is a preset relation edge weight parameter. $W_{node}$ represents a degree of influence of the nodes on a whole topological structure, and $W_{rel}$ represents a degree of influence of the relation edges on the whole topological structure. $W_{node}$ and $W_{rel}$ may be given artificially by a designer according to an importance of the process and an importance of the assembly process.

When the assembly process topological structure of each type of product is expressed, the assembly processes of the products with different styles are basically similar, the assembly of the products with different styles may have more processes, and more differences lie in different parameters of the products with different styles in the same assembly process. Therefore, a difference in the assembly process topological structures of the products with different styles mainly lies in the nodes. In the step A, a difference of the whole topological structure is calculated by comprehensively considering differences of the nodes and the topological relations in the assembly process topological structure of the product.

Preferably, the step B specifically includes:

step B1: constructing the fuzzy compatibility matrix S representing a similarity among all topological structures of a set $V=\{v_1, v_2, v_3, \ldots, v_n\}$ of all the samples;

$$S = [s_{i,j}]_{n \times n} = \begin{bmatrix} 1 & & & & & \\ \vdots & \ddots & & & & \\ s_{i,1} & \ldots & 1 & & & \\ \vdots & \vdots & \vdots & \ddots & & \\ s_{j,1} & \ldots & s_{j,i} & \ldots & 1 & \\ \vdots & \vdots & \vdots & \vdots & \vdots & \ddots \\ s_{n,1} & \ldots & s_{n,i} & \ldots & s_{n,j} & \ldots & 1 \end{bmatrix};$$

step B2: taking the fuzzy compatibility matrix S as an input and constructing the fuzzy compatibility space X with different granule layers by the following methods, and clustering all the samples through the fuzzy compatibility space X:

step B21: setting a threshold $\lambda$, wherein $1=\lambda_1>\lambda_2>\lambda_3>\ldots>\lambda_n=0$, and when values of the threshold $\lambda$ are respectively $\lambda_1, \lambda_2, \lambda_3, \ldots, \lambda_n$, calculating the similarity $S(i,j)$ between the sample $v_i$ and the other sample $v_j$ in $V=\{v_1, v_2, v_3, \ldots, v_n\}$, wherein $i \in (1,n)$; and step B22: according to $$S_\lambda(i, j) = \begin{cases} 1, & S(i, j) \geq \lambda \\ 0, & S(i, j) < \lambda \end{cases},$$

obtaining all the samples meeting $S_\lambda(i,j)=1$ when $\lambda=\lambda_i$ to construct sample granules $G_i$, wherein $i=1, 2, 3, \ldots, n$, then constructing a corresponding granule layer $C(\lambda_i)$ through all the sample granules $G_i$, and finally constructing the fuzzy compatible space X according to all the granule layers $C(\lambda_i)$.

The larger the value of $\lambda_i$ is, the smaller the number of samples in the sample granule $G_i$ is, and the finer the granularity of the granule layer $C(\lambda_i)$ is. The smaller the value of $\lambda_i$ is, the larger the number of sample granules $G_i$ in the granule layer $C(\lambda_i)$ is, and the coarser the granularity of the granule layer $C(\lambda_i)$ is.

Preferably, the step C specifically includes:

step C1: calculating a granularity of the granule layer $C(\lambda_i)$, wherein $i=1, 2, 3, \ldots, n$:

$$E[C(\lambda_i)] = \sum_{j=1}^{g} \frac{|G_{i,k}|}{g} \times \log_2(|G_{i,k}|)$$

wherein $G_{i, k}$ is a kth sample granule in the granule layer $C(\lambda_i)$; $|G_{i, k}|$ is a number of samples contained in the kth sample granule; $\log_2(|G_{i, k}|)$ represents an amount of information needed to completely distinguish all granules in the sample granule $G_{i, k}$; and g represents a number of sample granules in the granule layer $C(\lambda_i)$;

step C2: calculating an information increment $IG[C(\lambda_i)]$ of the granule layer $C(\lambda_i)$, wherein $1=1, 2, 3, \ldots, n$:

$$IG[C(\lambda_i)]=E[C(\lambda_i)]-E[C(\lambda_{i-1})];$$

step C3: calculating an information increment and a comprehensive value $D_i$ of the similarity among the samples of the granule layer $C(\lambda_i)$, wherein $i=1, 2, 3, \ldots, n$:

$$D_i=IG[C(\lambda_i)]*W_{ig}+\lambda_i W_\lambda;$$

wherein $W_{ig}$ is a weight of the information increment of the granule layer $C(\lambda_i)$, and $W_\lambda$ is a weight of a sample similarity threshold of the granule layer $C(\lambda_i)$; and step C4: screening out a granule layer with a maximum comprehensive value $D_i$ as an optimal granule layer $C(\lambda_o)$.

The granularity of the granule layer $C(\lambda_i)$ is regarded as an average amount of information needed to completely distinguish all sample granules in the granule layer. When the coarse granule layer $C(\lambda_i)$ is converted to the fine granule layer $C(\lambda_{i-1})$, information gain may occur. The larger the information increment is, the more meaningful the conversion is during granule layer conversion. Meanwhile, a degree of similarity of the samples in the sample granule may also affect an effectiveness of final equalization. The larger the threshold $\lambda$ is, the higher the similarity of the samples is, and the worse the equalization effect is. Therefore, it is necessary to comprehensively consider the information increment of the granule layer $C(\lambda_i)$ and the similarity of the samples to comprehensively determine the optimal granule layer $C(\lambda_o)$, which means that the optimal granule layer $C(\lambda_o)$ should have a large information increment and a minimum similarity at the same time.

The weights $W_{ig}$ and $W_\lambda$ are randomly selected from previous sample data, then determined samples of the optimal granule layer $C(\lambda_o)$ are calculated, and the samples determined for the first time are trained with the following machine learning algorithm model, so as to obtain a result. Then, the weighs $W_{ig}$ and $W_\lambda$ are adjusted according to the result, and iterated for many times to make a final result optimal, so as to obtain a final weight value.

Preferably, the step D specifically includes:

step D1: calculating an average number $\overline{G_i}$ of samples of each sample granule $G_i$ the optimal granule layer $C(\lambda_o)$:

$$\overline{G_i} = \frac{1}{g}\sum_{k=0}^{g}|G_{i,k}|;$$

step D2: increasing and decreasing a number of samples of each sample granule $G_i$ in the optimal granule layer $C(\lambda_o)$ by a random sampling method, so that the number of the samples in each sample granule $G_i$ is the same to complete the equalization processing:

if $|G_{i, k}|>\overline{G_i}$, randomly eliminating extra samples of the sample granule $G_{i, k}$, so that the number $|G_{i, k}|$ of the samples in the sample granule $G_{i, k}$ is decreased to $\overline{G_i}$; and if $|G_{i, k}|<\overline{G_i}$, copying original samples in the sample granule $G_{i, k}$ into the sample granule $G_{i, k}$ again, so that the number $|G_{i, k}|$ of the samples in the sample granule $G_{i, k}$ is increased to $\overline{G_i}$.

Embodiment 2

An inhomogeneous sample equalization system for a product assembly process according to the embodiment takes an assembly process topological structure of a product as a sample, and takes assembly process topological structures of same products with different styles as different samples, wherein the system includes:

a similarity generation module configured to calculate a similarity among different samples;

a fuzzy compatibility space construction module configured to construct a fuzzy compatibility matrix S for representing the similarity among all the samples, construct a fuzzy compatibility space X with different granule layers through the fuzzy compatibility matrix S, and cluster all samples through the fuzzy compatibility space X, wherein the fuzzy compatibility space X is divided into a plurality of different granule layers according to the similarity among the samples;

an optimal granule layer generation module configured to, based on a granular calculating mode, screen out a granule layer with a maximum comprehensive value of an information increment and the similarity among the samples from the fuzzy compatible space X to serve as an optimal granule layer; and an equalization module configured to carry out equalization processing on a sample of the optimal granule layer.

According to the inhomogeneous sample equalization system for the product assembly process, equalization of inhomogeneous samples of the product assembly process is solved, and an accuracy of a final prediction result and a generalization ability of a model are improved; the similarity of the assembly process topological structures of the same products with different styles is also considered, and the samples are clustered from this point of view, so that a problem that the samples are not easy to be homogenized due to a strong relevance of internal data of the samples is solved, thus being more in line with a characteristic of such sample of the product assembly process, and making a final equalized result more scientific. The same products with different styles may be mobile phones with different styles, such as a senior citizen mobile phone, a bezel-less display mobile phone, a curved display mobile phone, a three-camera mobile phone, a single-camera mobile phone, and the like.

According to the inhomogeneous sample equalization system for the product assembly process, by constructing the fuzzy compatibility space X, the samples may be clustered into different granule layers, and the samples may be observed and analyzed from multiple granule layers, so as to obtain the optimal granule layer $C(\lambda_o)$, so that more representative and accurate sample granule may be obtained, and the number of the samples in each sample granule is homogenized from the optimal granule layer $C(\lambda_o)$, so that an equalized effect is more representative.

Preferably, the similarity generation module includes:

a node similarity generation sub-module configured to calculate a node similarity among different samples:

$$S_{node}(v_i, v_j) = \frac{2 \times m_{i,j}}{e_i + e_j},$$

wherein i represents a same product of an $i^{th}$ type, j represents a same product of a $j^{th}$ type, and $S_{node}(v_i, v_j)$ represents a node similarity between an assembly process topological structure $v_i$ of the same product of the $i^{th}$ type and an assembly process topological structure $v_j$ of the same product of the $j^{th}$ type; $m_{i,j}$ represents a number of nodes matched in the assembly process topological structure $v_i$ and the assembly process topological structure $v_j$; $e_i$ represents a sum of a number of all nodes in the assembly process topological structure $v_i$; and $e_j$ represents a sum of a number of all nodes in the assembly process topological structure $v_j$;

a topological relation similarity generation sub-module configured to calculate a topological relation similarity among different samples:

$$S_{rel}(v_i, v_j) = \frac{2 \times M_{i,j}}{E_i + E_j},$$

wherein $S_{rel}(v_i, v_j)$ represents a topological relation similarity between the assembly process topological structure $v_i$ of the same product of the $i^{th}$ type and the assembly process topological structure $v_j$ of the same product of the $j^{th}$ type; $M_{i,j}$ represents a number of relation edges matched in the assembly process topological structure $v_i$ and the assembly process topological structure $v_j$; $E_i$ represents a sum of a number of all relation edges in the assembly process topological structure $v_i$; and $E_j$ represents a sum of a number of all relation edges in the assembly process topological structure $v_j$; and a topological structure similarity generation sub-module configured to calculate a topological structure similarity among different samples:

$$S(i,j)=S_{node}(v_i,v_j) \times W_{node}+S_{rel}(v_i,v_j) \times W_{rel},$$

wherein S(i, j) represents the topological structure similarity between the assembly process topological structure $v_i$ of the same product of the $i^{th}$ type and the assembly process topological structure $v_j$ of the same product of the $j^{th}$ type, $W_{node}$ is a preset node weight parameter, and $W_{rel}$ is a preset relation edge weight parameter.

$W_{node}$ represents a degree of influence of the nodes on a whole topological structure, and $W_{rel}$ represents a degree of influence of the relation edges on the whole topological structure. $W_{node}$ and $W_{rel}$ may be given artificially by a designer according to an importance of a technology and an assembly process.

When the assembly process topological structure of each type of product is expressed, the assembly processes of the products with different styles are basically similar, the assembly of the products with different styles may have more processes, and more differences lie in different parameters of the products with different styles in the same assembly process. Therefore, a difference in the assembly process topological structures of the products with different styles mainly lies in the nodes. According to the similarity generation module, a difference of the whole topological structure is calculated by comprehensively considering differences of the nodes and the topological relations in the assembly process topological structure of the product.

Preferably, the fuzzy compatibility space construction module includes:

a fuzzy compatibility matrix generation sub-module configured to construct the fuzzy compatibility matrix S representing a similarity among all topological structures of a set $V=\{v_1, v_2, v_3, \ldots, v_n\}$ of all the samples;

$$S = [s_{i,j}]_{n \times n} = \begin{bmatrix} 1 & & & & & \\ \vdots & \ddots & & & & \\ s_{i,1} & \cdots & 1 & & & \\ \vdots & \vdots & \vdots & \ddots & & \\ s_{j,1} & \cdots & s_{j,i} & \cdots & 1 & \\ \vdots & \vdots & \vdots & \vdots & \vdots & \ddots \\ s_{n,1} & \cdots & s_{n,i} & \cdots & s_{n,j} & \cdots & 1 \end{bmatrix};$$

a granule layer generation sub-module configured to take the fuzzy compatibility matrix S as an input and constructing the fuzzy compatibility space X with different granule layers by the following methods, and cluster all the samples through the fuzzy compatibility space X:

a first unit configured to set a threshold $\lambda$, wherein $1=\lambda_1>\lambda_2>\lambda_3> \ldots >\lambda_n=0$, and when values of the threshold $\lambda$ are respectively $\lambda_1, \lambda_2, \lambda_3, \ldots, \lambda_n$, calculating the similarity S(i, j) between the sample $v_i$ and the other sample $v_j$ in $V=\{v_1, v_2, v_3, \ldots, v_n\}$, wherein $i \in (1,n)$; and a second unit configured to, according to $$S_\lambda(i, j) = \begin{cases} 1, S \ (i, j) \geq \lambda \\ 0, S \ (i, j) < \lambda \end{cases},$$

obtain all the samples meeting $S_\lambda(i,j)=1$ when $\lambda=\lambda_i$ to construct sample granules $G_i$, wherein i=1, 2, 3, ..., n, then construct a corresponding granule layer $C(\lambda_i)$ through all the sample granules $G_i$, and finally construct the fuzzy compatible space X according to all the granule layers $C(\lambda_i)$.

The larger the value of $\lambda_i$ is, the smaller the number of samples in the sample granule $G_i$ is, and the finer the granularity of the granule layer $C(\lambda_i)$ is. The smaller the value of $\lambda_i$ is, the larger the number of sample granules $G_i$ in the granule layer $C(\lambda_i)$ is, and the coarser the granularity of the granule layer $C(\lambda_i)$ is.

Preferably, the optimal granule layer generation module includes:

a granularity calculation sub-module configured to calculate a granularity of the granule layer $C(\lambda_i)$, wherein i=1, 2, 3, ..., n:

$$E[C(\lambda_i)] = \sum_{j=1}^{g} \frac{|G_{i,k}|}{g} \times \log_2(|G_{i,k}|),$$

wherein $G_{i,k}$ is a kth sample granule in the granule layer $C(\lambda_i)$; $|G_{i,k}|$ is a number of samples contained in the kth sample granule; $\log_2(|G_{i,k}|)$ represents an amount of information needed to completely distinguish all granules in the sample granule $G_{i,k}$; and g represents a number of sample granules in the granule layer $C(\lambda_i)$;

an information increment calculation sub-module configured to calculate an information increment $IG[C(\lambda_i)]$ of the granule layer $C(\lambda_i)$, wherein i=1, 2, 3, ..., n:

$$IG[C(\lambda_i)]=E[C(\lambda_i)]-E[C(\lambda_{i-1})];$$

a comprehensive value calculation sub-module configured to calculate an information increment and a comprehensive value $D_i$ of the similarity among the samples of the granule layer $C(\lambda_i)$, wherein i=1, 2, 3, ..., n:

$$D_i=IG[C(\lambda_i)]*W_{ig}+\lambda_i W_\lambda,$$

wherein $W_{ig}$ is a weight of the information increment of the granule layer $C(\lambda_i)$, and $W_\lambda$ is a weight of a sample similarity threshold of the granule layer $C(\lambda_i)$; and a screening sub-module configured to screen out a granule layer with a maximum comprehensive values $D_i$ as an optimal granule layer $C(\lambda_o)$.

The granularity of the granule layer $C(\lambda_i)$ is regarded as an average amount of information needed to completely distinguish all sample granules in the granule layer. When the coarse granule layer $C(\lambda_i)$ is converted to the fine granule layer $C(\lambda_{i-1})$, information gain may occur. The larger the information increment is, the more meaningful the conversion is during the granule layer conversion. Meanwhile, a degree of similarity of the samples in sample granule may also affect an effectiveness of final equalization. The larger the threshold $\lambda$ is, the higher the similarity of the samples is, and the worse the equalization effect is. Therefore, it is necessary to comprehensively consider the information increment of the granule layer $C(\lambda_i)$ and the similarity of the samples to comprehensively determine the optimal granule layer $C(\lambda_o)$, which means that the optimal granule layer $C(\lambda_o)$ should have a large information increment and a minimum similarity at the same time.

The weights $W_{ig}$ and $W_\lambda$ are randomly selected from previous sample data, then determined samples of the optimal granule layer $C(\lambda_o)$ are calculated, and the samples determined for the first time are trained with the following machine learning algorithm model, so as to obtain a result. Then, the weights $W_{ig}$ and $W_{ig}$ are adjusted according to the result, and iterated for many times to make a final result optimal, so as to obtain a final weight value.

Preferably, the equalization module includes:

an average sample number calculation sub-module configured to calculate an average number $\overline{G_i}$ of samples of each sample granule $G_i$ in the optimal granule layer $C(\lambda_o)$:

$$\overline{G_i} = \frac{1}{g}\sum_{k=0}^{g} |G_{i,k}|;$$

and a sample increasing and decreasing sub-module configured to increase and decrease a number of samples of each sample granule $G_i$ in the optimal granule layer $C(\lambda_o)$ by a random sampling method, so that the number of the samples in each sample granule $G_i$ is the same to complete the equalization processing if $|G_{i,k}|>\overline{G_i}$, randomly eliminating extra samples of the sample granule $G_{i,k}$, so that the number $|G_{i,k}|$ of the samples in the sample granule $G_{i,k}$ is decreased to $\overline{G_i}$; and if $|G_{i,k}|<\overline{G_i}$, copying original samples in the sample granule $G_{i,k}$ into the sample granule $G_{i,k}$ again, so that the number $|G_{i,k}|$ of the samples in the sample granule $G_{i,k}$ is increased to $\overline{G_i}$.

The technical principles of the disclosure are described above with reference to the specific embodiments. These descriptions are only for the purpose of explaining the principles of the disclosure, but cannot be interpreted as a limitation on the scope of protection of the disclosure in any form. Based on the explanation herein, those skilled in the art may think of other specific implementations of the disclosure without going through any creative work, and these implementations shall all fall within the scope of protection of the disclosure.

What is claimed is:

1. An inhomogeneous sample equalization method for a product assembly process which takes an assembly process topological structure of a product as a sample, and takes assembly process topological structures of same products with different styles as different samples, wherein the method comprises the following steps of:

step A: calculating a similarity among different samples;

step B: constructing a fuzzy compatibility matrix S for representing the similarity among all the samples, constructing a fuzzy compatibility space X with different granule layers through the fuzzy compatibility matrix S, and clustering all samples through the fuzzy compatibility space X, wherein the fuzzy compatibility space X is divided into a plurality of different granule layers according to the similarity among the samples;

step C: based on a granular calculating mode, screening out a granule layer with a maximum comprehensive value of an information increment and the similarity among the samples from the fuzzy compatible space X to serve as an optimal granule layer; and step D: carrying out equalization processing on a sample of the optimal granule layer;

the step D specifically comprises:

step D1: calculating an average number $\overline{G_i}$ of samples of each sample granule $G_i$ in the optimal granule layer $C(\lambda_o)$:

$$\overline{G_i} = \frac{1}{g}\sum_{k=0}^{g}|G_{i,k}|;$$

wherein, a threshold is set as $\lambda$, and values of the threshold $\lambda$ are respectively $\lambda_1, \lambda_2, \lambda_3, \ldots, \lambda_n$, and $1=\lambda_1>\lambda_2>\lambda_3> \ldots >\lambda_n=0$, and wherein $G_{i,k}$ is a kth sample granule in the granule layer $C(\lambda_i)$; $|G_{i,k}|$ is a number of samples contained in the kth sample granule; g represents a number of sample granules in the granule layer $C(\lambda_i)$;

step D2: increasing and decreasing a number of samples of each sample granule $G_i$ in the optimal granule layer $C(\lambda_o)$ by a random sampling method, so that the number of the samples in each sample granule $G_i$ is the same to complete the equalization processing:

if $|G_{i,k}|>\overline{G_i}$, randomly eliminating extra samples of the sample granule $G_{i,k}$, so that the number $|G_{i,k}|$ of the samples in the sample granule $G_{i,k}$ is decreased to $\overline{G_i}$; and if $|G_{i,k}|<\overline{G_i}$, copying original samples in the sample granule $G_{i,k}$ into the sample granule $G_{i,k}$ again, so that the number $|G_{i,k}|$ of the samples in the sample granule $G_{i,k}$ is increased to $\overline{G_i}$.

2. The inhomogeneous sample equalization method for the product assembly process according to claim 1, wherein the step A specifically comprises:

step A1: calculating a node similarity among different samples:

$$S_{node}(v_i, v_j) = \frac{2 \times m_{i,j}}{e_i + e_j}$$

wherein i represents a same product of an $i^{th}$ type, j represents a same product of a $j^{th}$ type, and $S_{node}(v_i, v_j)$ represents a node similarity between an assembly process topological structure $v_i$ the same product of the $i^{th}$ type and an assembly process topological structure $v_j$ of the same product of the $j^{th}$ type; $m_{i,j}$ represents a number of nodes matched in the assembly process topological structure $v_i$ and the assembly process topological structure $v_j$; $e_i$ represents a sum of a number of all nodes in the assembly process topological structure $v_i$; and $e_j$ represents a sum of a number of all nodes in the assembly process topological structure $v_j$;

step A2: calculating a topological relation similarity among different samples:

$$S_{rel}(v_i, v_j) = \frac{2 \times M_{i,j}}{E_i + E_j}$$

wherein $S_{rel}(v_i, v_j)$ represents a topological relation similarity between the assembly process topological structure $v_i$ the same product of the $i^{th}$ type and the assembly process topological structure $v_j$ of the same product of the $j^{th}$ type; $M_{i,j}$ represents a number of relation edges matched in the assembly process topological structure $v_i$ and the assembly process topological structure $v_j$; $E_i$ represents a sum of a number of all relation edges in the assembly process topological structure $v_i$; and $E_j$ represents a sum of a number of all relation edges in the assembly process topological structure $v_j$; and step A3: calculating a topological structure similarity among different samples:

$$S(i,j)=S_{node}(v_i,v_j) \times W_{node}+S_{rel}(v_i,v_j) \times W_{rel},$$

wherein $S(i, j)$ represents the topological structure similarity between the assembly process topological structure $v_i$ of the same product of the $i^{th}$ type and the assembly process topological structure $v_j$ of the same product of the $j^{th}$ type, $W_{node}$ is a preset node weight parameter, and $W_{rel}$ is a preset relation edge weight parameter.

3. The inhomogeneous sample equalization method for the product assembly process according to claim 2, wherein the step B specifically comprises:

step B1: constructing the fuzzy compatibility matrix S representing a similarity among all topological structures of a set $V=\{v_1, v_2, v_3, \ldots, v_n\}$ of all the samples;

$$S = [S(i, j)]_{n \cdot n} = \begin{bmatrix} 1 & & & & & \\ \vdots & \ddots & & & & \\ S(i,1) & \ldots & 1 & & & \\ \vdots & \vdots & \vdots & \ddots & & \\ S(j,1) & \ldots & S(j,i) & \ldots & 1 & \\ \vdots & \vdots & \vdots & \vdots & \vdots & \ddots \\ S(n,1) & \ldots & S(n,i) & \ldots & S(n,j) & \ldots & 1 \end{bmatrix};$$

step B2: taking the fuzzy compatibility matrix S as an input and constructing the fuzzy compatibility space X with different granule layers by the following methods, and clustering all the samples through the fuzzy compatibility space X:

step B21: setting a threshold $\lambda$, wherein $1=\lambda_1>\lambda_2>\lambda_3> \ldots >\lambda_n=0$, and when values of the threshold $\lambda$ are respectively $\lambda_1, \lambda_2, \lambda_3, \ldots, \lambda_n$, calculating the similarity $S(i, j)$ between the sample $v_i$ and the other sample $v_j$ in $V=\{v_1, v_2, v_3, \ldots, v_n\}$, wherein $i \in (1,n)$; and step B22: according to $$S_\lambda(i, j) = \begin{cases} 1, & S(i, j) \geq \lambda \\ 0, & S(i, j) < \lambda \end{cases},$$

obtaining all the samples meeting $S_\lambda(i,j)=1$ when $\lambda=\lambda_i$ to construct sample granules $G_i$, wherein $i=1, 2, 3, \ldots, n$, then constructing a corresponding granule layer $C(\lambda_i)$ through all the sample granules $G_i$, and finally constructing the fuzzy compatible space X according to all the granule layers $C(\lambda_i)$.

4. The inhomogeneous sample equalization method for the product assembly process according to claim 3, wherein the step C specifically comprises:

step C1: calculating a granularity of the granule layer $C(\lambda_i)$, wherein $i=1, 2, 3, \ldots, n$:

$$E[C(\lambda_i)] = \sum_{j=1}^{g} \frac{|G_{i,k}|}{g} \times \log_2(|G_{i,k}|)$$

wherein $G_{i,k}$ is a $k^{th}$ sample granule in the granule layer $C(\lambda_i)$; $|G_{i,k}|$ is a number of samples contained in the $k^{th}$ sample granule; $\log_2(|G_{i,k}|)$ represents an amount of information needed to completely distinguish all granules in the sample granule $G_{i,\,k}$; and g represents a number of sample granules in the granule layer $C(\lambda_i)$;

step C2: calculating an information increment $IG[C(\lambda_i)]$ of the granule layer $C(\lambda_i)$, wherein $l=1, 2, 3, \ldots, n$:

$$IG[C(\lambda_i)]=E[C(\lambda_i)]-E[C(\lambda_{i-1})];$$

step C3: calculating an information increment and a comprehensive value $D_i$ of the similarity among the samples of the granule layer $C(\lambda_i)$, wherein $i=1, 2, 3, \ldots, n$:

$$D_i=IG[C(\lambda_i)]*W_{ig}+\lambda_i W_\lambda;$$

wherein $W_{ig}$ is a weight of the information increment of the granule layer $C(\lambda_i)$, and $W_\lambda$ is a weight of a sample similarity threshold of the granule layer $C(\lambda_i)$; and step C4: screening out a granule layer with a maximum comprehensive value $D_i$ as an optimal granule layer $C(\lambda_o)$.

5. An inhomogeneous sample equalization system for a product assembly process, which takes an assembly process topological structure of a product as a sample, and takes assembly process topological structures of same products with different styles as different samples, wherein the system comprises:

a similarity generation module configured to calculate a similarity among different samples;

a fuzzy compatibility space construction module configured to construct a fuzzy compatibility matrix S for representing the similarity among all the samples, construct a fuzzy compatibility space X with different granule layers through the fuzzy compatibility matrix S, and cluster all samples through the fuzzy compatibility space X, wherein the fuzzy compatibility space X is divided into a plurality of different granule layers according to the similarity among the samples;

an optimal granule layer generation module configured to, based on a granular calculating mode, screen out a granule layer with a maximum comprehensive value of an information increment and the similarity among the samples from the fuzzy compatible space X to serve as an optimal granule layer; and an equalization module configured to carry out equalization processing on a sample of the optimal granule layer; wherein the equalization module comprises:

an average sample number calculation sub-module configured to calculate an average number $\overline{G_i}$ of samples of each sample granule $G_i$ in the optimal granule layer $C(\lambda_o)$;

$$\overline{G_i} = \frac{1}{g}\sum_{k=0}^{g}|G_{i,k}|;$$

wherein, a threshold is set as $\lambda$, and values of the threshold $\lambda$ are respectively $\lambda_1, \lambda_2, \lambda_3, \ldots, \lambda_n$, and $1=\lambda_1>\lambda_2>\lambda_3> \ldots >\lambda_n=0$, and wherein $G_{i,\,k}$ is a kth sample granule in the granule layer $C(\lambda_i)$; $|G_{i,\,k}|$ is a number of samples contained in the kth sample granule; g represents a number of sample granules in the granule layer $C(\lambda_i)$; and a sample increasing and decreasing sub-module configured to increase and decrease a number of samples of each sample granule $G_i$ in the optimal granule layer $C(\lambda_o)$ by a random sampling method, so that the number of samples in each sample granule $G_i$ is the same to complete the equalization processing:

if $|G_{i,\,k}|>\overline{G_i}$, randomly eliminating extra samples of the sample granule $G_{i,\,k}$, so that the number $|G_{i,\,k}|$ of the samples in the sample granule $G_{i,\,k}$ is decreased to $\overline{G_i}$; and if $|G_{i,\,k}|<\overline{G_i}$, copying original samples in the sample granule $G_{i,\,k}$ into the sample granule $G_{i,\,k}$ again, so that the number $|G_{i,\,k}|$ of the samples in the sample granule $G_{i,\,k}$ is increased to $\overline{G_i}$.

6. The inhomogeneous sample equalization system for the product assembly process according to claim 5, wherein the similarity generation module comprises:

a node similarity generation sub-module configured to calculate a node similarity among different samples:

$$S_{node}(v_i, v_j) = \frac{2 \times m_{i,j}}{e_i + e_j},$$

wherein i represents a same product of an $i^{th}$ type, j represents a same product of a $j^{th}$ type, and $S_{node}(v_i, v_j)$ represents a node similarity between an assembly process topological structure $v_i$ the same product of the $i^{th}$ type and an assembly process topological structure $v_j$ of the same product of the $j^{th}$ type; $m_{i,\,j}$ represents a number of nodes matched in the assembly process topological structure $v_i$ and the assembly process topological structure $v_j$; $e_i$ represents a sum of a number of all nodes in the assembly process topological structure $v_i$; and $e_j$ represents a sum of a number of all nodes in the assembly process topological structure $v_j$;

a topological relation similarity generation sub-module configured to calculate a topological relation similarity among different samples:

$$S_{rel}(v_i, v_j) = \frac{2 \times M_{i,j}}{E_i + E_j},$$

wherein $S_{rel}(v_i, v_j)$ represents a topological relation similarity between the assembly process topological structure $v_i$ the same product of the $i^{th}$ type and the assembly process topological structure $v_j$ of the same product of the $j^{th}$ type; $M_{i,\,j}$ represents a number of relation edges matched in the assembly process topological structure $v_i$ and the assembly process topological structure $v_j$; $E_i$ represents a sum of a number of all relation edges in the assembly process topological structure $v_i$; and $E_j$ represents a sum of a number of all relation edges in the assembly process topological structure $v_j$; and a topological structure similarity generation sub-module configured to calculate a topological relation similarity among different samples:

$$S(i,j)=S_{node}(v_i,v_j)\times W_{node}+S_{rel}(v_i,v_j)\times W_{rel},$$

wherein $S(i, j)$ represents the topological structure similarity between the assembly process topological structure $v_i$ of the same product of the $i^{th}$ type and the assembly process topological structure $v_j$ of the same product of the $j^{th}$ type, $W_{node}$ is a preset node weight parameter, and $W_{rel}$ is a preset relation edge weight parameter.

7. The inhomogeneous sample equalization system for the product assembly process according to claim 6, wherein the fuzzy compatibility space construction module comprises:

a fuzzy compatibility matrix generation sub-module configured to construct the fuzzy compatibility matrix S representing a similarity among all topological structures of a set $V=\{v_1, v_2, v_3, \ldots, v_n\}$ of all the samples;

$$S = [S(i,j)]_{n \cdot n} = \begin{bmatrix} 1 & & & & & & \\ \vdots & \ddots & & & & & \\ S(i,1) & \ldots & 1 & & & & \\ \vdots & \vdots & \vdots & \ddots & & & \\ S(j,1) & \ldots & S(j,i) & \ldots & 1 & & \\ \vdots & \vdots & \vdots & \vdots & \ddots & & \\ S(n,1) & \ldots & S(n,i) & \ldots & S(n,j) & \ldots & 1 \end{bmatrix};$$

a granule layer generation sub-module configured to take the fuzzy compatibility matrix S as an input and constructing the fuzzy compatibility space X with different granule layers by the following methods, and clustering all the samples through the fuzzy compatibility space X:

a first unit configured to set a threshold $\lambda$, wherein $1=\lambda_1>\lambda_2>\lambda_3> \ldots >\lambda_n=0$, and when values of the threshold $\lambda$ are respectively $\lambda_1, \lambda_2, \lambda_3, \ldots, \lambda_n$, calculating the similarity $S(i, j)$ between the sample $v_i$ and the other sample $v_j$ in $V=\{v_1, v_2, v_3, \ldots, v_n\}$, wherein $i \in (1,n)$; and a second unit configured to, according to $$S_\lambda(i,j) = \begin{cases} 1, S\ (i,j) \geq \lambda \\ 0, S\ (i,j) < \lambda \end{cases},$$

obtaining all the samples meeting $S_\lambda(i,j)=1$ when $\lambda=\lambda_i$ to construct sample granules $G_i$, wherein $i=1, 2, 3, \ldots, n$, then constructing a corresponding granule layer $C(\lambda_i)$ through all the sample granules $G_i$, and finally constructing the fuzzy compatible space X according to all the granule layers $C(\lambda_i)$.

8. The inhomogeneous sample equalization system for the product assembly process according to claim 7, wherein the optimal granule layer generation module comprises:

a granularity calculation sub-module configured to calculate a granularity of the granule layer $C(\lambda_i)$, wherein $i=1, 2, 3, \ldots, n$:

$$E[C(\lambda_i)] = \sum_{j=1}^{g} \frac{|G_{i,k}|}{g} \times \log_2(|G_{i,k}|),$$

wherein $G_{i,k}$ is a $k^{th}$ sample granule in the granule layer $C(\lambda_i)$; $|G_{i,k}|$ is a number of samples contained in the $k^{th}$ sample granule; $\log_2(|G_{i,k}|)$ represents an amount of information needed to completely distinguish all granules in the sample granule $G_{i,k}$; and g represents a number of sample granules in the granule layer $C(\lambda_i)$;

an information increment calculation sub-module configured to calculate an information increment $IG[C(\lambda_i)]$ of the granule layer $C(\lambda_i)$, wherein $1=1, 2, 3, \ldots, n$:

$$IG[C(\lambda_i)]=E[C(\lambda_i)]-E[C(\lambda_{i-1})];$$

a comprehensive value calculation sub-module configured to calculate an information increment and a comprehensive value $D_i$ of the similarity among the samples of the granule layer $C(\lambda_i)$, wherein $i=1, 2, 3, \ldots, n$:

$$D_i=IG[C(\lambda_i)]*W_{ig}+\lambda_i W_\lambda,$$

wherein $W_{ig}$ is a weight of the information increment of the granule layer $C(\lambda_i)$, and $W_\lambda$ is a weight of a sample similarity threshold of the granule layer $C(\lambda_i)$; and a screening sub-module configured to screen out a granule layer with a maximum comprehensive value $D_i$ as an optimal granule layer $C(\lambda_o)$.

* * * * *